(12) United States Patent
Han et al.

(10) Patent No.: US 11,305,297 B2
(45) Date of Patent: Apr. 19, 2022

(54) COMPACT LOW FLOW RATE FLUIDIC NOZZLE FOR SPRAYING AND CLEANING APPLICATIONS HAVING A REVERSE MUSHROOM INSERT GEOMETRY

(71) Applicant: DLHBOWLES, INC., Canton, OH (US)

(72) Inventors: Edward Han, Laurel, MD (US); Shridhar Gopalan, Westminster, MD (US); Chunling Zhao, Ellicott City, MD (US)

(73) Assignee: DLHBOWLES, INC., Canton, OH (US)

( * ) Notice: Subject to any disclaimer, the term of this patent is extended or adjusted under 35 U.S.C. 154(b) by 0 days.

(21) Appl. No.: 16/000,141

(22) Filed: Jun. 5, 2018

(65) Prior Publication Data

US 2018/0345299 A1  Dec. 6, 2018

Related U.S. Application Data

(60) Provisional application No. 62/515,358, filed on Jun. 5, 2017.

(51) Int. Cl.
*B05B 1/00* (2006.01)
*B05B 1/08* (2006.01)
(Continued)

(52) U.S. Cl.
CPC .................. *B05B 1/00* (2013.01); *B05B 1/08* (2013.01); *B60S 1/52* (2013.01); *B60R 1/00* (2013.01);
(Continued)

(58) Field of Classification Search
CPC ..... B05B 1/08; B05B 1/00; B60S 1/52; B60S 1/56; B60R 2300/802; B60R 2300/8066; B60R 1/00
(Continued)

(56) References Cited

U.S. PATENT DOCUMENTS 4,122,845 A * 10/1978 Stouffer ............... A61C 17/028
239/589.1
4,463,904 A    8/1984 Bray, Jr.
(Continued)

FOREIGN PATENT DOCUMENTS

DE    102005007095         8/2006
FR       2915251 A1 * 10/2008 ............... B05B 1/08
JP      2012035654         2/2012

OTHER PUBLICATIONS

International Searching Authority, U.S. Patent Office, International Search Report and Written Opinion for International App. No. PCT/US2015/025489 dated Jul. 16, 2015.
(Continued)

*Primary Examiner* — Cody J Lieuwen
(74) *Attorney, Agent, or Firm* — McDonald Hopkins LLC (57) ABSTRACT

The invention relates to various low flow rate fluidic nozzle inserts having a reverse mushroom-shaped mushroom insert geometry that are useful for a wide range of spraying and cleaning applications. In one embodiment, the present invention relates to fluidic nozzle inserts that are able to perform at low flow rates with geometrical and dimensional limitations. In still another embodiment, the present invention relates to compact fluidic nozzle inserts that provide a manner by which to attain a desired level of performance in a fluidic nozzle assembly for small scale applications at low flow rates.

28 Claims, 8 Drawing Sheets

(51) Int. Cl.
*B60S 1/52* (2006.01)
*B60R 1/00* (2006.01)
*B60S 1/56* (2006.01)

(52) U.S. Cl.
CPC . *B60R 2300/802* (2013.01); *B60R 2300/8066* (2013.01); *B60S 1/56* (2013.01)

(58) Field of Classification Search
USPC .......................................... 239/284.1, 589.1
See application file for complete search history.

(56) References Cited

U.S. PATENT DOCUMENTS

| | | | |
|---|---|---|---|
| 4,508,267 A | 4/1985 | Stouffer | |
| 5,550,677 A | 8/1996 | Schofield | |
| 5,670,935 A | 9/1997 | Schofield | |
| 5,724,187 A | 3/1998 | Varaprasad | |
| 5,749,525 A | 5/1998 | Stouffer | |
| 5,760,962 A | 6/1998 | Schofield | |
| 5,796,094 A | 8/1998 | Schofield | |
| 5,854,708 A | 12/1998 | Komatsu | |
| 5,877,897 A | 3/1999 | Schofield | |
| 5,949,331 A | 9/1999 | Schofield | |
| 6,013,372 A | 1/2000 | Hayakawa | |
| 6,071,606 A | 6/2000 | Yamazaki | |
| 6,097,023 A | 8/2000 | Schofield | |
| 6,189,808 B1 | 2/2001 | Daniels | |
| 6,193,378 B1 | 2/2001 | Tonar | |
| 6,201,642 B1 | 3/2001 | Bos | |
| 6,222,447 B1 | 4/2001 | Schofield | |
| 6,253,782 B1* | 7/2001 | Raghu | B05B 1/08 137/14 |
| 6,302,545 B1 | 10/2001 | Schofield | |
| 6,396,397 B1 | 5/2002 | Bos | |
| 6,498,620 B2 | 12/2002 | Schofield | |
| 6,523,964 B2 | 2/2003 | Schofield | |
| RE38,013 E | 3/2003 | Stouffer | |
| 6,611,202 B2 | 8/2003 | Schofield | |
| 6,690,268 B2 | 2/2004 | Schofield | |
| 6,717,610 B1 | 4/2004 | Bos | |
| 6,757,109 B2 | 6/2004 | Bos | |
| 6,834,906 B2 | 12/2004 | Vaitus | |
| 7,005,974 B2 | 2/2006 | McMahon | |
| 7,038,577 B2 | 5/2006 | Pawlicki | |
| 7,267,290 B2 | 9/2007 | Gopalan | |
| 7,339,149 B1 | 3/2008 | Schofield | |
| 7,563,505 B2 | 7/2009 | Reihs | |
| 7,965,336 B2 | 6/2011 | Bingle | |
| 8,149,327 B2 | 4/2012 | Lin | |
| 9,538,054 B2 | 1/2017 | Hayakawa | |
| 9,663,073 B2 | 5/2017 | Tanaka | |
| 2003/0124360 A1 | 7/2003 | Reihs | |
| 2004/0189831 A1 | 9/2004 | Shibatani | |
| 2004/0200027 A1 | 10/2004 | Sugihara | |
| 2005/0129394 A1 | 6/2005 | Ichikawa | |
| 2006/0091242 A1 | 5/2006 | Gopalan | |
| 2006/0157591 A1 | 7/2006 | Eisele | |
| 2006/0289678 A1 | 12/2006 | Sakai | |
| 2008/0081108 A1 | 4/2008 | Yamada | |
| 2008/0210780 A1 | 9/2008 | Discher | |
| 2009/0250533 A1 | 10/2009 | Akiyama | |
| 2010/0090036 A1* | 4/2010 | Allen | B05B 1/08 239/589.1 |
| 2010/0230991 A1 | 9/2010 | Fioravanti | |
| 2011/0061692 A1 | 3/2011 | Gopalan | |
| 2011/0073142 A1 | 3/2011 | Hattori | |
| 2011/0147479 A1 | 6/2011 | Overskeid | |
| 2011/0266375 A1 | 11/2011 | Ono | |
| 2011/0292212 A1 | 12/2011 | Tanabe | |
| 2012/0117745 A1 | 5/2012 | Hattori | |
| 2012/0162428 A1 | 6/2012 | Wee | |
| 2012/0266922 A1 | 10/2012 | Krahn | |
| 2013/0092758 A1 | 4/2013 | Tanaka | |
| 2013/0142026 A1 | 6/2013 | Matsumura | |
| 2013/0146577 A1 | 6/2013 | Haig | |
| 2013/0209079 A1 | 8/2013 | Alexander | |
| 2013/0255023 A1 | 10/2013 | Kikuta | |
| 2013/0319486 A1 | 12/2013 | Kikuta | |
| 2014/0060582 A1 | 3/2014 | Hartranft | |
| 2015/0138357 A1 | 5/2015 | Romack | |
| 2015/0203077 A1 | 7/2015 | Gokan | |
| 2016/0001330 A1 | 1/2016 | Romack | |
| 2016/0030954 A1* | 2/2016 | Gopalan | B05B 1/08 239/466 |
| 2017/0036647 A1 | 2/2017 | Zhao | |
| 2017/0036650 A1 | 2/2017 | Hester | |
| 2018/0318848 A1* | 11/2018 | Bobusch | F15B 21/12 |

OTHER PUBLICATIONS

International Searching Authority, U.S. Patent Office, International Search Report and Written Opinion for International App. No. PCT/US2015/026204 dated Aug. 10, 2015.

International Searching Authority, U.S. Patent Office, International Search Report and Written Opinion for International App. No. PCT/US2012/028828 dated Jun. 22, 2012.

International Searching Authority, European Patent Office, International Search Report and Written Opinion for International App. No. PCT/US2018/035983 dated Sep. 17, 2018.

* cited by examiner

COMPACT LOW FLOW RATE FLUIDIC NOZZLE FOR SPRAYING AND CLEANING APPLICATIONS HAVING A REVERSE MUSHROOM INSERT GEOMETRY

RELATED APPLICATION DATA

This US non-provisional application claims priority to U.S. provisional patent application No. 62/515,358 filed Jun. 5, 2017, the entire disclosure of which is incorporated herein by reference.

FIELD OF THE INVENTION

The invention relates to various low flow rate fluidic nozzle inserts having a reverse mushroom-shaped mushroom insert geometry that are useful for a wide range of spraying and cleaning applications. In one embodiment, the present invention relates to fluidic nozzle inserts that are able to perform at low flow rates with geometrical and dimensional limitations. In still another embodiment, the present invention relates to compact fluidic nozzle inserts that provide a manner by which to attain a desired level of performance in a fluidic nozzle assembly for small scale applications at low flow rates.

BACKGROUND OF THE INVENTION

The US National Highway Traffic Safety Administration ("NHTSA") has mandated that as of 2018 all new vehicles must include a rearview or "backup" camera system to minimize the likelihood of "backovers." A backover is a specifically-defined type of accident, in which a non-occupant of a vehicle (i.e., a pedestrian or cyclist) is struck by a vehicle moving in reverse. Automotive original equipment manufacturers ("OEMs") are thus adding external rearview cameras to all new cars. In addition, OEMs want more cameras to see into any other blind spot around a vehicle's periphery (behind, to the side, or in front) and all of these cameras necessarily include exterior lens surfaces which will eventually become soiled with road grime, mud and the like. For cosmetic and styling reasons vehicle OEMs desire to have functional cameras and corresponding lens cleaning devices which do not detract from the automotive designer's vision for the vehicle, so an entirely invisible camera and camera lens cleaning system would be ideal. Providing a camera system with its attendant lens cleaning system in an assembly which fits within the vehicle's exterior trim in a manner that is not visually conspicuous and so does not intrude into the vehicle's design is problematic.

External view (e.g., front bumper, side-view, rear-view or back-up) cameras have been added to recreational vehicles and automobiles to enhance the driver's vision and to improve safety. Increasingly, a wide range of cars and SUVs include a number of integrated video cameras which generate images for display to the driver, operator or other occupants or users within the vehicle's interior. The recent introductions of front-bumper, side-view and rear-view cameras in cars and SUVs by vehicle manufacturers allow drivers to see whether obstacles surround their vehicle using a display screen mounted either on a rear view mirror or in a navigation system screen.

The external image sensors such as those known as back-up or rear view cameras are typically mounted unobtrusively, and incorporated into existing features such as the vehicle's rear name plate. These external cameras are exposed to the vehicle's harsh environmental surroundings and are often soiled by mud, salt spray or dirt which accumulates on the lens. Accumulating dirt and debris often distort the image drivers are viewing, thus creating confusion, dissatisfaction or a safety issue due to poor judgment by relying on an unclear picture.

The advent of low cost, reliable imaging devices using solid-state sensor technologies (e.g., CMOS pixel sensor technology), combined with an improved cost/performance ratio for video displays capable of meeting automotive specifications, and an increasing application rate of video monitor displays for automotive navigation systems and the like, has led to an increasing use of cameras or imaging sensors designed to give the driver a view of those areas around the vehicle which are not in the normal direct field of view of the driver, typically referred to as "blind spots." These areas include the region close to the front of the vehicle, typically obscured by the forward structure of the vehicle, the region along the passenger side of the vehicle, the region along the driver's side of the vehicle rearward of the driver, and the area or region immediately rearward of the vehicle which cannot be seen directly or indirectly through the rear view mirror system. The camera or imaging sensor may capture an image of the rearward (or sideward or other blind spot area) field of view, and the image may be displayed to the driver of the vehicle to assist the driver in backing up or reversing or otherwise driving or maneuvering the vehicle.

The use of electronic cameras in vehicle imaging systems can significantly increase a diligent driver's knowledge of the space immediately surrounding the vehicle prior to and during low speed maneuvers, and thus contributes to the safe completion of such maneuvers. It is thus known to provide a camera or imaging sensor on a vehicle for providing an image of an exterior scene for the driver. Such a camera may be positioned within a protective housing, which may be closed about the camera or sensor and secured together via fasteners or screws or the like. For example, a metallic protective housing may be provided, such as a die cast housing of aluminum or zinc or the like. In particular, for camera sensors mounted on the exterior of a vehicle, protection against environmental effects, such as rain, snow, road splash and/or the like, and physical protection, such as against road debris, dirt, dust, and/or the like, is important. Thus, for example, in known exterior camera sensor mounts, a butyl seal, such as a hot dispensed butyl seal, or an O-ring or other sealing member or material or the like, has been provided between the parts of the housing to assist in sealing the housing to prevent water or other contaminants from entering the housing and damaging the camera or sensor positioned therein. However, such housings typically do not provide a substantially water tight seal, and water droplets thus may enter the housing. Furthermore, any excessive vibration of the camera sensor, due to its placement (such as at the exterior of the vehicle), may lead to an undesirable instability of the image displayed to the driver of the vehicle. Also, such cameras or sensors are costly to manufacture and to implement on the vehicles.

Such vehicle vision systems often position a camera or imaging sensor at an exterior portion of a vehicle to capture an image of an exterior scene. The cameras, particularly the cameras for rearward vision systems, are thus typically placed or mounted in a location that tends to get a high dirt buildup on the camera and/or lens of the camera, with no easy way of cleaning the camera and/or lens. In order to reduce the dirt or moisture buildup on the lenses of such cameras, prior art developers proposed using hydrophilic or hydrophobic coatings on the lenses. However, the use of such a hydrophilic or hydrophobic coating on the lens is not typically effective due to the lack of air flow across the lens, especially within a sealed housing. It has also been proposed to use heating devices or elements to reduce moisture on the lenses, within the sealed housing. However, the use of a heated lens in such applications, while reducing condensation and misting on the lens, may promote the forming of a film on the lens due to contamination that may be present in the moisture or water. Also, the appearance of such cameras on the rearward portion of vehicles is often a problem for styling of the vehicle.

Based on consumer preference and at least a perceived improved ability to extract important (e.g., child location) information from the image, it is desired to present an image to the driver that is representative of the exterior scene as perceived by normal human vision. It is also desirable that a vehicle's imaging devices or systems be useful in all conditions, and particularly in all weather and lighting conditions. However, it is often difficult to provide an imaging sensor which is capable of providing a clear image in poor weather, especially while driving. This is because conventional imaging systems typically have difficulty resolving scene information when the camera's objective lens is partially obstructed by accumulated debris (e.g., accumulated dirt, dust, mud, road salt or other built-up debris).

In order to have effective use of the camera-based visibility systems in all weather conditions, it is desirable to have an effective method of keeping the camera lens (or the housing surface protecting the objective lens) clean, but the potentially deleterious effects of moisture in various prior art devices remain. When driving or operating a vehicle during bad weather, drivers are especially reluctant to exit the vehicle to find and inspect the camera's lens.

Increasingly on modern vehicles, cameras or other sensors such as infrared image sensors are incorporated to provide additional information to the driver. Many of these sensing devices can become soiled and obstructed by dirt and debris common in the driving environment, eventually causing deterioration in the efficacy of the sensing device or possibly rendering it unusable, or providing an undesirable appearance. It is therefore desirable to periodically wash these sensing devices to reduce or eliminate the buildup of obstructive debris. However, there are restrictions which are unique to certain sensor wash applications which limit use of traditional washer nozzles. Backup cameras or other sensors may need to be placed on or near the vehicle centerline, in close proximity to branding badges or other cosmetically important features on the vehicle, and it is undesirable to add a visible washer nozzle in this aesthetically important area. Another restriction is that sensors may have very wide fields of view, up to or exceeding 180°, so a traditional lens washer nozzle configuration would have to project over the lens in a manner which would place that washer nozzle within the sensor's field of view in order to be able to direct fluid against the lens at an angle which would provide acceptable cleaning.

Being located within the sensors field of view may block a significant portion of area the sensor would otherwise be capable of monitoring. A third constraint which affects sensor wash applications is that the sensor may frequently be located on an area of the vehicle which sees higher levels of contamination than do typical washer nozzle mounting locations, such as on the front grill or the rear lift gate. Washer nozzles in these locations may be at a higher risk of being clogged by the same material which obscures the sensor. There is a need, therefore, for an effective yet visually unobtrusive system and method for cleaning an exterior objective lens or wide-angle sensor's exterior surface, and preferably by remote control.

Additionally, many modern day applications require fluidic nozzles that are able to perform at low flow rates with geometrical and dimensional limitations. For example, automotive sensory and camera wash applications must account for various factors that restrict the geometry of fluidic nozzles while performing at the desired specifications. The majority of fluidic nozzles are not designed to perform in smaller scale operations. In smaller scale designs, there is a decline in fluidic nozzle performance to the extent of being non-functional, including instability in the spray profile, collapsing of the spray fan, and poor performance in high viscosity conditions. The compact fluidic nozzle provides a way to attain desired performance specifications in small scale applications at low flow rates.

This application is related to commonly owned U.S. provisional patent application No. 61/451,492 filed Mar. 10, 2011, and U.S. provisional patent application No. 61/978,775 filed Apr. 11, 2014; PCT application No. PCT/US12/28828 filed Mar. 10, 2012; U.S. patent application Ser. No. 14/086,746, filed Nov. 21, 2013; and U.S. Pat. No. 6,253,782, the entire disclosures of which are incorporated herein by reference for background and enablement.

Accordingly, it is an object of the present invention to overcome the above mentioned difficulties by providing an effective and visually unobtrusive system and method for cleaning an exterior objective lens or wide-angle sensor's exterior surface to remove accumulated debris (e.g., accumulated dirt, dust, mud, road salt or other built-up debris) including, but not limited to, instances where fluidic nozzles are desired to perform at low flow rates with geometrical and dimensional limitations.

SUMMARY OF THE INVENTION

The invention relates to various low flow rate fluidic nozzle inserts having a reverse mushroom-shaped mushroom insert geometry that are useful for a wide range of spraying and cleaning applications. In one embodiment, the present invention relates to fluidic nozzle inserts that are able to perform at low flow rates with geometrical and dimensional limitations. In still another embodiment, the present invention relates to compact fluidic nozzle inserts that provide a manner by which to attain a desired level of performance in a fluidic nozzle assembly for small scale applications at low flow rates.

In one embodiment, the present invention relates to a fluidic nozzle assembly having therein at least one compact fluidic nozzle insert (e.g., one having a width of about 5.5 mm or less, and a length of 5 mm or less). Nozzle assemblies that contain one or more compact fluidic nozzle inserts are found to be uniquely effective for applications with very limited space due to visibility/aesthetic reasons. Usually a fluidic nozzle insert is limited by a minimum size requirement to successfully generate fluidic oscillations, which in turn produces a spray. The compact fluidic nozzle insert of the present invention has new features that enable fluidic operation in a smaller size (than previously known or available) to produce a spray fan at low flow rates. Typical flow rates are less than 300 mL/min at 25 psi. It is also characterized by high velocity, large drops, uniform distribution and improved high viscosity operation.

In one particular instance, the compact fluidic nozzle assembly of the present invention includes a compact housing configured to receive, aim and provide fluid communication to a fluid source and a fluidic nozzle insert or chip which, when assembled, incorporates features that alleviates the performance issues that occur in smaller scale fluidic nozzles. These characteristics include reduction in spray instability and improvement in high viscosity performance.

One of the biggest drawbacks or performance issues that applicants see in compact fluidic nozzle assemblies is that there is significant instability, collapsing fan, yaw, roll, and significant decrease in high viscosity performance. A major cause of this issue is the small fluidic geometry and low flow rate, both of which produce low Reynolds number (Re). At low Re, fluidic oscillations are harder to initiate, maintain and are also unstable. Typical (e.g., Applicants' own prior) fluidic designs have larger interaction region that enable fluidic oscillations and spray. Solving these problems required development and testing of new fluidic configurations with new features to overcome the size and "low Re" limitations. The compact fluidic nozzle assembly of the present invention, and its corresponding fluidic nozzle insert, produces high velocity droplets which are critical in applications such as automotive sensory and camera wash applications.

The compact fluidic nozzle assembly, and the one or more fluidic nozzle inserts located therein, of the present invention are designed with certain features that improve performance in both the spray distribution and in high viscosity conditions. The interaction region ("IR") of the fluidic nozzle insert is important to minimizing the amount of unwanted yaw and roll that is seen in the spray profile resulting from the smaller size of the compact fluidic nozzle. In Applicants' prior work, the interaction region is dome-shaped (see FIG. 1, which illustrates features described and illustrated further in Applicants' commonly owned U.S. Pat. No. 6,253,782) while the current invention typically is designed to work with a flat-top interaction region. The flattop interaction region provides a larger corner region for the vortices to form and, as a result, the oscillating jet produces a more desirable spray fan. The power nozzle angle, or jet angle, determines the location of where the two jets from intersect, $J_A$ (see FIG. 3).

Applicants have found through development and testing of prototypes, that the best performing configuration or fluidic geometry has a jet intersect angle ($J_A$) to be in the range of 100° to 150° to attain the desired spray fan and minimize the amount of yaw that occurs. Also, where applicants' prior fluidic geometries included a horizontal rectilinear (e.g., straight transverse) throat wall, the recent development work for the present invention includes the discovery that a concave or curvilinear wall segment provides better performance.

In one embodiment, the present invention relates to a fluidic nozzle insert comprising: a fluidic nozzle insert structure having a width (W) less than or equal to about 7.5 mm and length (L) less than or equal to about 8 mm; and a fluidic oscillator geometry having a compact curved, bottom wall radius ($W_C$) in the range of about 0.5 mm to about 2 mm, wherein an edge block is defined having an edge block length ($T_L$) can range with respect to the throat width ($T_W$) anywhere from 0 to about 0.8 times the throat width ($T_W$), wherein a width of the interaction region ($I_W$) is about 5 to about 10 times a power nozzle width ($P_W$), wherein a height of the interaction region ($I_H$) is about 4 to about 8 times the power nozzle width ($P_W$), and wherein a throat offset ($T_O$) is within the range of about 0.05 to about 0.3 times the height of the interaction region ($I_H$).

In another embodiment, the present invention relates to a fluidic nozzle assembly comprising: a fluidic nozzle assembly comprising: a nozzle post, wherein the nozzle post is designed to be mountable; a raised fluidic nozzle insert receptacle, wherein the nozzle insert receptacle is designed to receive at least one fluidic nozzle insert in at least one cavity formed therein; and a nozzle body, wherein the nozzle body is located between and connects both the nozzle post and the a raised fluidic nozzle insert receptacle, wherein the fluidic nozzle insert comprises: a fluidic nozzle insert structure having a width (W) less than or equal to about 7.5 mm and length (L) less than or equal to about 8 mm; and a fluidic oscillator geometry having a compact curved, bottom wall radius ($W_C$) in the range of about 0.5 mm to about 2 mm, wherein an edge block is defined having an edge block length ($T_L$) can range with respect to the throat width ($T_W$) anywhere from 0 to about 0.8 times the throat width ($T_W$), wherein a width of the interaction region ($I_W$) is about 5 to about 10 times a power nozzle width ($P_W$), wherein a height of the interaction region ($I_H$) is about 4 to about 8 times the power nozzle width ($P_W$), and wherein a throat offset ($T_O$) is within the range of about 0.05 to about 0.3 times the height of the interaction region ($I_H$).

DETAILED DESCRIPTION OF THE INVENTION

The invention relates to various low flow rate fluidic nozzle inserts having a reverse mushroom-shaped mushroom insert geometry that are useful for a wide range of spraying and cleaning applications. In one embodiment, the present invention relates to fluidic nozzle inserts that are able to perform at low flow rates with geometrical and dimensional limitations. In still another embodiment, the present invention relates to compact fluidic nozzle inserts that provide a manner by which to attain a desired level of performance in a fluidic nozzle assembly for small scale applications at low flow rates.

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

Referring now to FIGS. 2 through 5, a compact fluidic nozzle insert 100 having in one instance a width of less than 7.5 mm, 7 mm, 6.5 mm, 6 mm, 5.5 mm, or even 5 mm is illustrated. In one embodiment, the fluidic nozzle insert of the present invention has a width of about 5.15 mm. In all instances, the fluidic nozzle inserts of the present invention are found to be uniquely effective for applications with very limited space due to visibility/aesthetic reasons. As noted above, a fluidic nozzle insert and its corresponding fluidic nozzle assembly (see FIGS. 6 and 7, where the fluidic nozzle assembly is in one embodiment 8 mm in width and 8 mm in length) are usually limited by a minimum size requirement to successfully generate fluidic oscillations, which in turn produces a spray. The compact nozzle of the present invention has a new structural orientation that enables fluidic operation in a smaller size nozzle (than previously known or available) so as to produce a spray fan at low flow rates. Typical flow rates are less than about 300 mL/min at 25 psi, and the spray fan has an angle of about 20° to about 60°. The fluidic nozzles of the present invention are also characterized by high velocity, large drops, uniform distribution and improved high viscosity operation. This result is due to the unique features and design elements described below with regard to fluidic nozzle inset 200.

The compact fluidic nozzle assembly (see FIGS. 6 and 7) of the present invention includes a compact housing configured to receive, aim and provide fluid communication to a fluid source and a fluidic nozzle insert or chip which, when assembled, incorporates features that alleviates the performance issues that occur in smaller scale fluidic nozzles. These characteristics include reduction in spray instability and improvement in high viscosity performance.

One of the biggest drawbacks or performance issues that applicants see in compact fluidic nozzle assemblies is that there is significant instability, collapsing fan, yaw, roll, and significant decrease in high viscosity performance. A major cause of this issue is the small fluidic geometry and low flow rate, both of which produce low Reynolds number (Re). At low Re, fluidic oscillations are harder to initiate, maintain and are also unstable. Typical (e.g., Applicants' own prior) fluidic designs have larger interaction region that enable fluidic oscillations and spray. Solving these problems required development and testing of new fluidic configurations with new features to overcome the size and "low Re" limitations. The compact fluidic nozzle assembly of the present invention, and its corresponding fluidic nozzle insert 200, produces high velocity droplets which are critical in applications such as automotive sensory and camera wash applications.

The compact fluidic nozzle insert of the present invention is designed with certain features that improve performance in both the spray distribution and in high viscosity conditions. The interaction region ("$I_R$", see FIG. 2) of the fluidic nozzle insert is important to minimizing the amount of unwanted yaw and roll that is seen in the spray profile resulting from the smaller size of the compact fluidic nozzle assembly. In Applicants' prior work, the interaction region is dome-shaped (see FIG. 1, which illustrates features described and illustrated further in Applicants' commonly owned U.S. Pat. No. 6,253,782) while the current invention typically is designed to work with a flat-top interaction region (see, e.g. FIGS. 2 through 4).

The fluidic oscillator of the present invention is defined within or includes a fluidic nozzle insert, or chip member, 200 having an oscillation inducing chamber, at least one source of fluid under pressure, at least a pair of power nozzles (PN1, PN2) connected to the at least one source of fluid under pressure for projecting at least a pair of fluid jets into the oscillation chamber, and at least one outlet orifice from the oscillation chamber for issuing a pulsating or oscillating jet of fluid to a point of utilization or ambient. A common fluid manifold connected to power nozzles PN1, PN2. The shape of the power nozzle manifold forms one of the walls of defining the "flat top" interaction or oscillation chamber. In some of the fluidic circuits, the length can be matched to fit existing housings. The power nozzle can have offsets which produce yaw angles in a liquid spray fan angle to the left or right depending on the direction desired. In some embodiments, the exit throat is off axis (off the central axis of the symmetry which is coaxial with a central spray axis) by a small fraction to the left or right to move the leftward or rightward yaw angles in the spray. The outlet throat may be offset along the longitudinal axis by a small amount to produce a yaw angle of predetermined degree to the left or right depending on what is desired. Thus, one can construct circuits for yaw using a combination of the techniques described above which suits most applications.

The flat-top interaction region provides a larger corner region for the vortices to form and, as a result, an oscillating jet issuing from the outlet orifice produces a more desirable spray fan. The power nozzle angle, or jet angle, determines the location of where the two jets from intersect, $J_A$ (see FIG. 3). Applicants have found that it is important for jet intersect angle $J_A$ to be in the range of about 100° to about 150° to attain the desired spray fan and minimize the amount of yaw that occurs. Where prior fluidic geometries included a horizontal throat wall, the recent development work for the present invention includes the discovery that a redesigned (now concave or curvilinear) wall segment, denoted as $W_C$, works best (see, e.g. FIGS. 2 through 4). The radius of the curved wall ($W_C$) segment can range from about 0.5 to about 2 mm. The curved wall is defined by $T_O$, the throat offset is a new feature incorporated into the present invention. The throat offset plays an important role in improving operation of the compact fluidic nozzle using one or more fluidic nozzle inserts, or chip members, according to the present invention in both warm and cold conditions, which determines the viscosity of the fluid. Without the curved wall, the spray distribution becomes unstable and there is significant roll. In high viscosity conditions, the issue with instability, yaw, and roll are magnified. The elongated throat, large edge block, denoted as $T_L$, is important in stabilizing the spray profile and reducing the amount of roll that occurs, especially in high viscosity conditions. The ideal range for the edge block was found to be 0 percent to about 80 percent of the width of the throat. The edge block is also defined with an angle, γ, can range from about 10° to about 30° (see, e.g. FIG. 3). The elongated throat provides the flowing fluid more time to oscillate and produce the desired spray distribution with minimal yaw and roll resulting in improved performance in low flow and high viscosity conditions.

Persons of skill in the art will recognize that this novel fluidic geometry provides enhanced performance from a surprising combination of features, including a compact configuration, where "compact" means having a width, W, less than or equal to about 5.00 mm (although in some embodiments the width can be greater as noted below) and length, L, less than or equal to about 5.50 mm (although in some embodiments the length can be greater as noted below). The compact curved, bottom wall radius ($W_C$) has been experimentally found to be the ideal range of about 0.5 mm or greater. The edge block length ($T_L$) can range with respect to the throat width ($T_W$), anywhere from 0.0 to about 0.8 times the throat width. The width of the interaction region ($I_W$) is ideally about 5 to about 10 times the Power Nozzle Width ($P_W$). The ear width is preferably a minimum of three times the width of the power nozzle and a maximum of interaction region ($I_W$). The height of the interaction region, (Interaction Height—$I_H$), is ideally about 4 to about 8 times Power Nozzle Width ($P_W$), and the throat offset, $T_O$, is preferably within the range of about 0.05 to about 0.3 times $I_H$.

Figure 1:
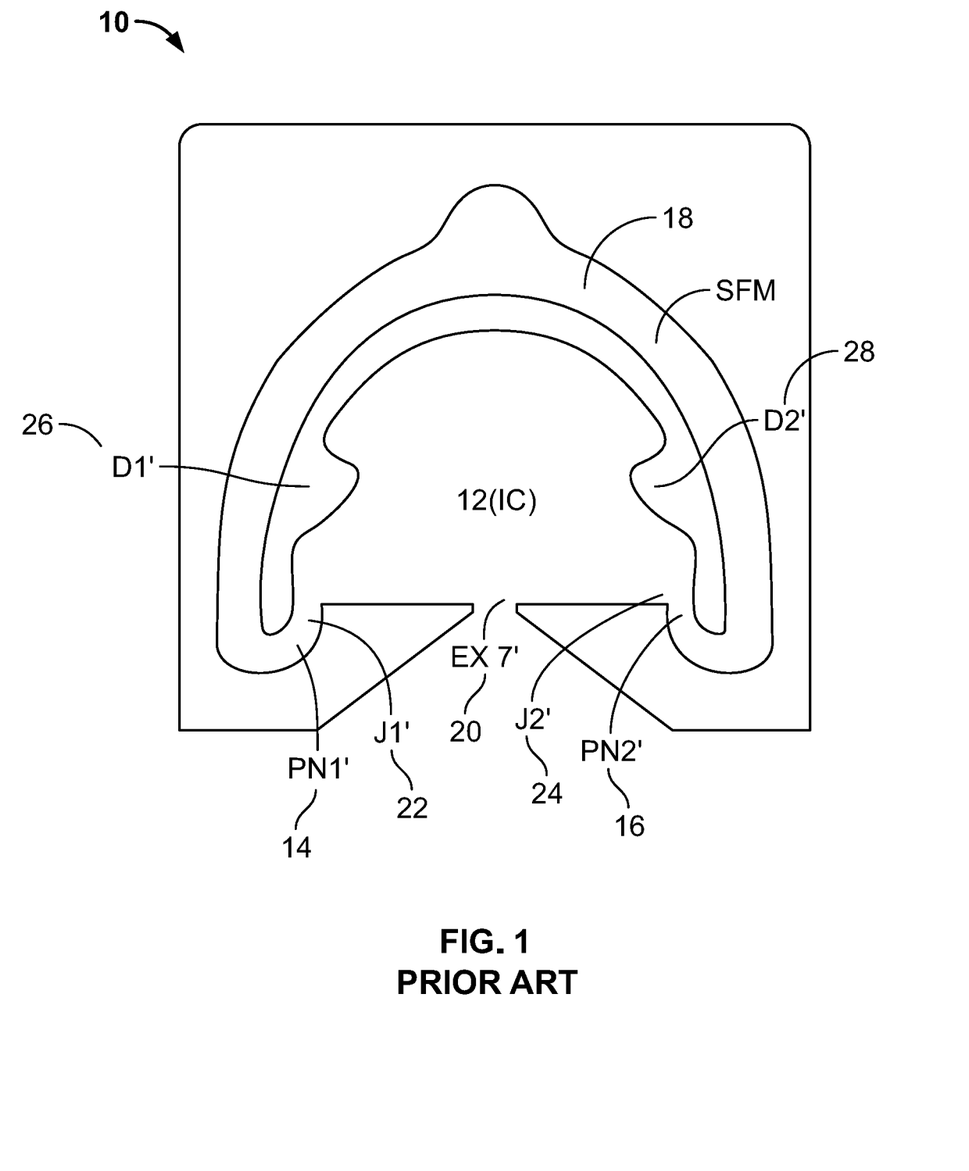
FIG. 1 is a cross-sectional view of a prior art fluidic nozzle insert.

Turning to FIG. 1 individually, FIG. 1 illustrates a cross-sectional view of one prior art fluidic nozzle insert 10. Fluidic nozzle insert 10 comprises an interaction chamber 12 (IC) having multiple power nozzles 14 and 16 (additionally labeled PN1' and PN2', respectively). The flow in the fluidic nozzle assembly chamber where such a fluidic nozzle insert 10 is utilized creates a four-vortex system (see U.S. Pat. No. 6,253,782) that is inherently unstable. This results in a sweeping jet at the exit or outlet aperture as shown in U.S. Pat. No. 6,253,782. Additionally, the embodiment of FIG. 1 uses a single feed manifold 18 (SFM) used with internal passages.

The embodiment shown in FIG. 1 has multiple input power nozzles 14 and 16 (PN1' and PN2') that are reversed in direction so as to generally head away from the outlet 20 (EX7') while still colliding in the interaction chamber 12 to produce oscillations in the output jet. In FIG. 1, the two power nozzles 14 and 16 (PN1' and PN2') issue jets 22 and 24 (additionally labeled J1' and J2', respectively), which are located and oriented or angled towards the dome-shape of the chamber and deflectors 26 and 28 (additionally labeled D1' and D2', respectively) which have been added to direct the flow toward the exit/outlet 20 (EX7') at the conditions required to produce the oscillatory flow.

Turning to FIGS. 2 through 5, the following nomenclature is utilized: $I_w$=(4.0 to 8.0)·$P_{w(total)}$ (Interaction Width); $I_H$=(5.0 to 10.0)·$P_{w(total)}$ (Interaction Height); γ represents the Edge Block Angle; $J_A$ represents the Jet Angle; $T_L$=(0.0 to 0.8)·$T_w$ (Edge Block Length); $T_O$=(0.05 to 0.3)·$I_H$ (Throat Offset); L represents the Length of Circuit; W represents the Width of Circuit; $P_w$ represents the Power Nozzle Width; $T_w$ represents the Throat Width; $I_R$ represents the Interaction Region (also called the interaction chamber); and $W_C$ represents the Curved Wall. In various embodiments the fluidic nozzle insert of the present invention is used to form a compact fluidic nozzle assembly having a width (W) less than or equal to about 10.5 mm, about 10 mm, about 9.5 mm, about 9 mm, about 8.5 mm, or even about 8 mm, and a length (L) less than or equal to about 10.5 mm, about 10 mm, about 9.5 mm, about 9 mm, about 8.5 mm, or even about 8 mm. In one embodiment, the fluidic nozzle insert, or chip member, of the present invention has a width (W) less than or equal to about 7.5 mm, about 7 mm, about 6.5 mm, about 6 mm, about 5.5 mm, or even about 5 mm, and a length (L) less than or equal to about 8 mm, about 7.5 mm, about 7 mm, about 6.5 mm, about 6 mm, or even about 5.5. Although not wishing to be limited to any one set of geometric relationships, generally speaking the width of the fluidic nozzle assemblies (e.g., fluidic nozzle assembly 604 of FIGS. 6 and 7) are about 3 mm greater than the width of the fluidic nozzle inserts 200 of the present invention.

Figure 2:
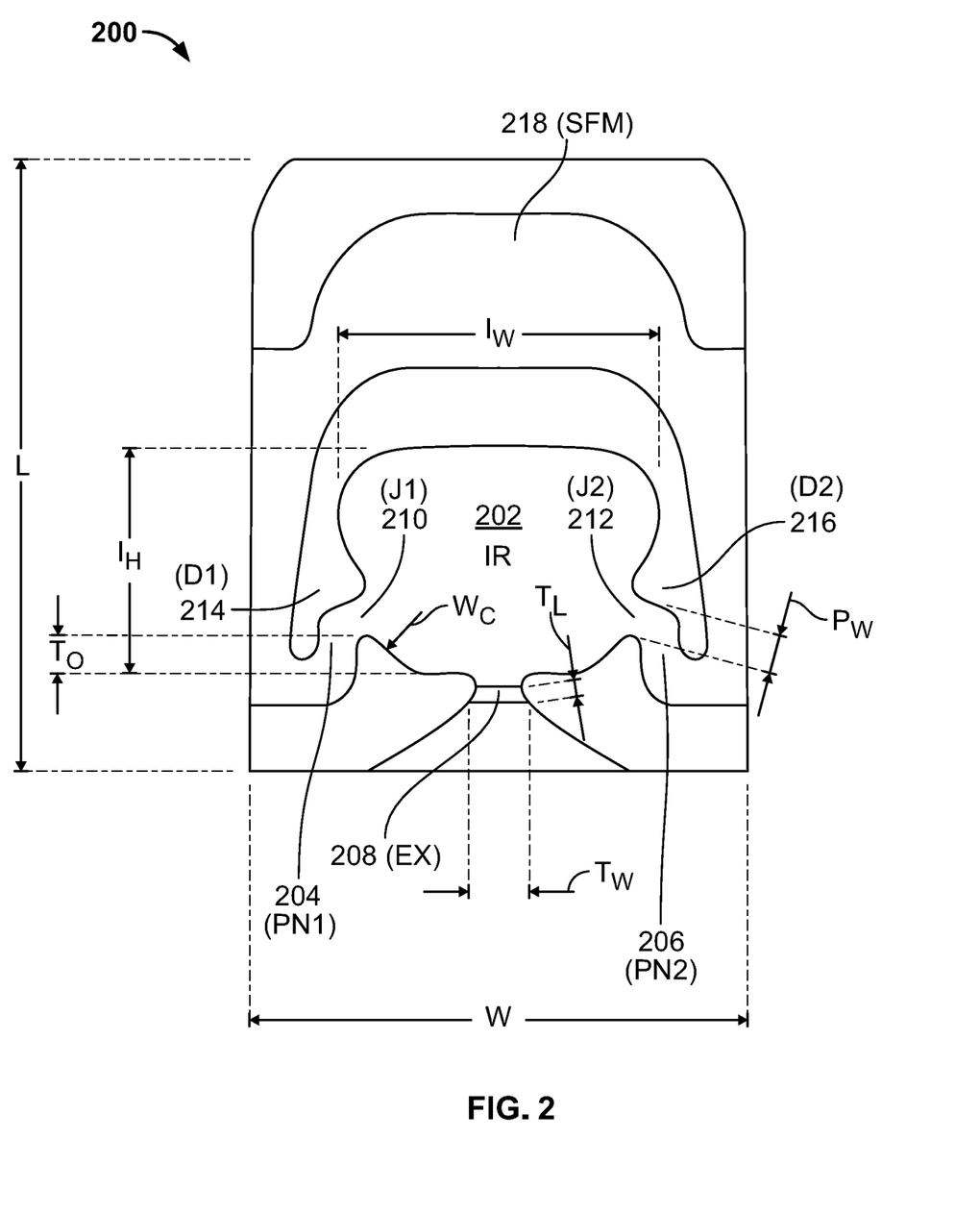
FIG. 2 is a cross-sectional view of a fluidic nozzle insert design according to one embodiment of the present invention.

Turning to FIG. 2, FIG. 2 illustrates a cross-sectional view of one embodiment of a fluidic nozzle insert, or chip member, 200 in accordance with the present invention. Fluidic nozzle insert 200 comprises an interaction chamber 202 (also called the Interaction Region and labeled $I_R$) having multiple power nozzles 204 and 206 (additionally labeled PN1 and PN2, respectively). The embodiment shown in FIG. 2 further comprises multiple input power nozzles 204 and 206 (PN1 and PN2) that are reversed in direction so as to generally head away from the outlet 208 (EX) while still colliding in the interaction chamber 202 to produce oscillations in the output jet. In FIG. 2, the two power nozzles 204 and 206 (PN1 and PN2) issue jets 210 and 212 (additionally labeled J1 and J2, respectively), which are located and oriented or angled towards the dome-shape of the chamber and deflectors 214 and 216 (additionally labeled D1 and D2, respectively) which have been added to direct the flow toward the exit/outlet 208 (EX) at the conditions required to produce the oscillatory flow. Additionally, the embodiment of FIG. 1 uses a single feed manifold 18 (SFM) used with internal passages. Additionally, the embodiment of FIG. 2 uses a single feed manifold 218 (SFM) used with internal passages.

Again, fluidic nozzle insert 200 of FIG. 2 has the following relationships determined by the width (W) and/or length (L) of fluidic nozzle 200 using the various measured items of FIG. 2: $I_w$=(4.0 to 8.0)·$P_{w(total)}$ (Interaction Width); $I_H$=(5.0 to 10.0)·$P_{w(total)}$ (Interaction Height); γ represents the Edge Block Angle; $J_A$ represents the Jet Angle; $T_L$=(0.0 to 0.8)·$T_w$ (Edge Block Length); $T_O$=(0.05 to 0.3)·$I_H$ (Throat Offset); L represents the Length of Circuit; W represents the Width of Circuit; $P_w$ represents the Power Nozzle Width; $T_w$ represents the Throat Width; $I_R$ represents the Interaction Region; and $W_C$ represents the Curved Wall. Where in various embodiments the fluidic nozzle insert of the present invention is a compact nozzle insert having a width (W) less than or equal to about 7.5 mm, about 7 mm, about 6.5 mm, about 6 mm, about 5.5 mm, or even about 5 mm, and a length (L) less than or equal to about 8 mm, about 7.5 mm, about 7 mm, about 6.5 mm, about 6 mm, or even about 5.5

Figure 3:
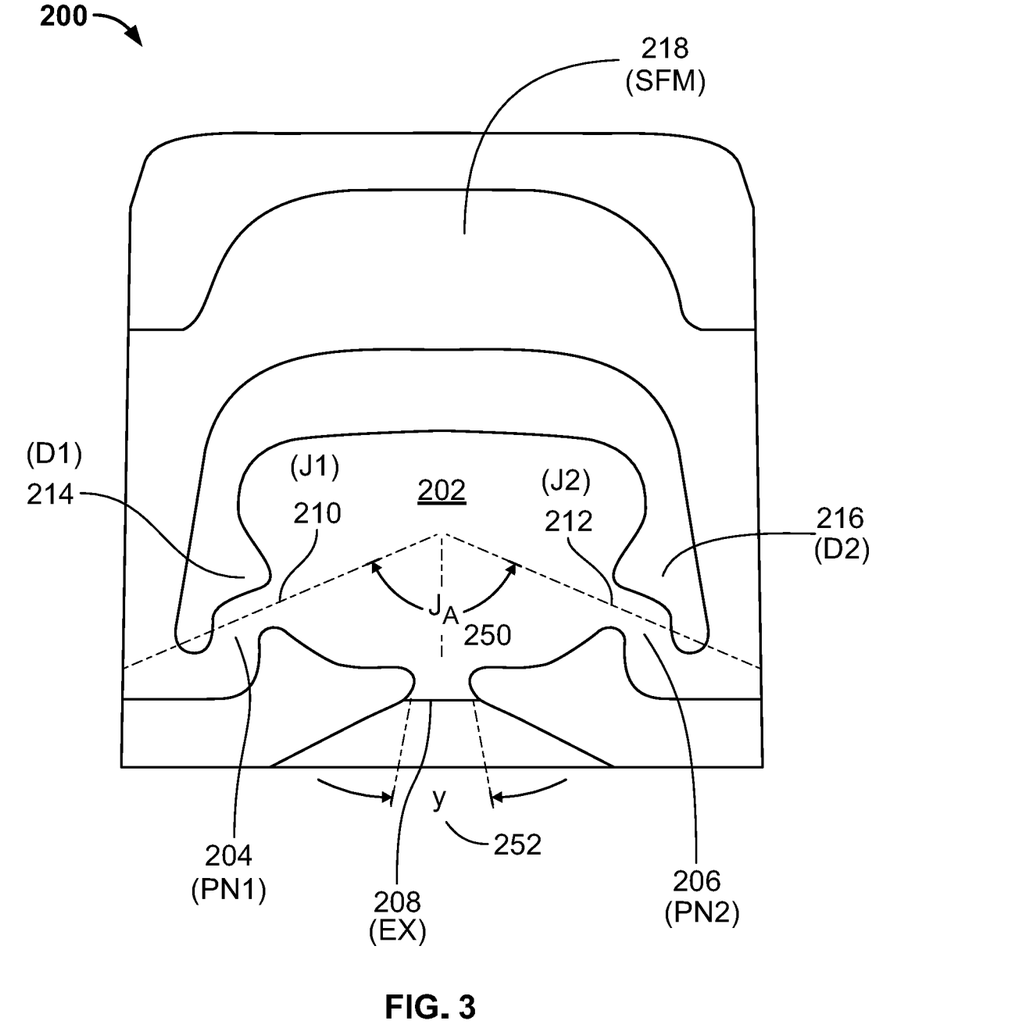
FIG. 3 is a cross-sectional view of a fluidic nozzle insert design according to another embodiment of the present invention.

Turning to FIG. 3, FIG. 3 illustrates a cross-sectional view of one embodiment of a fluidic nozzle insert 200 in accordance with the present invention where the power nozzle angle, or jet angle, 250 ($J_A$) determines the location of where the two jets 210 and 212 (J1 and J2) intersect. Applicants have found that it is important for jet intersect angle 250 ($J_A$) to be in the range of about 100° to about 150° to attain the desired spray fan and minimize the amount of yaw that occurs. Additionally, FIG. 3 illustrates γ, where γ represents the edge block angle 252.

Figure 4:
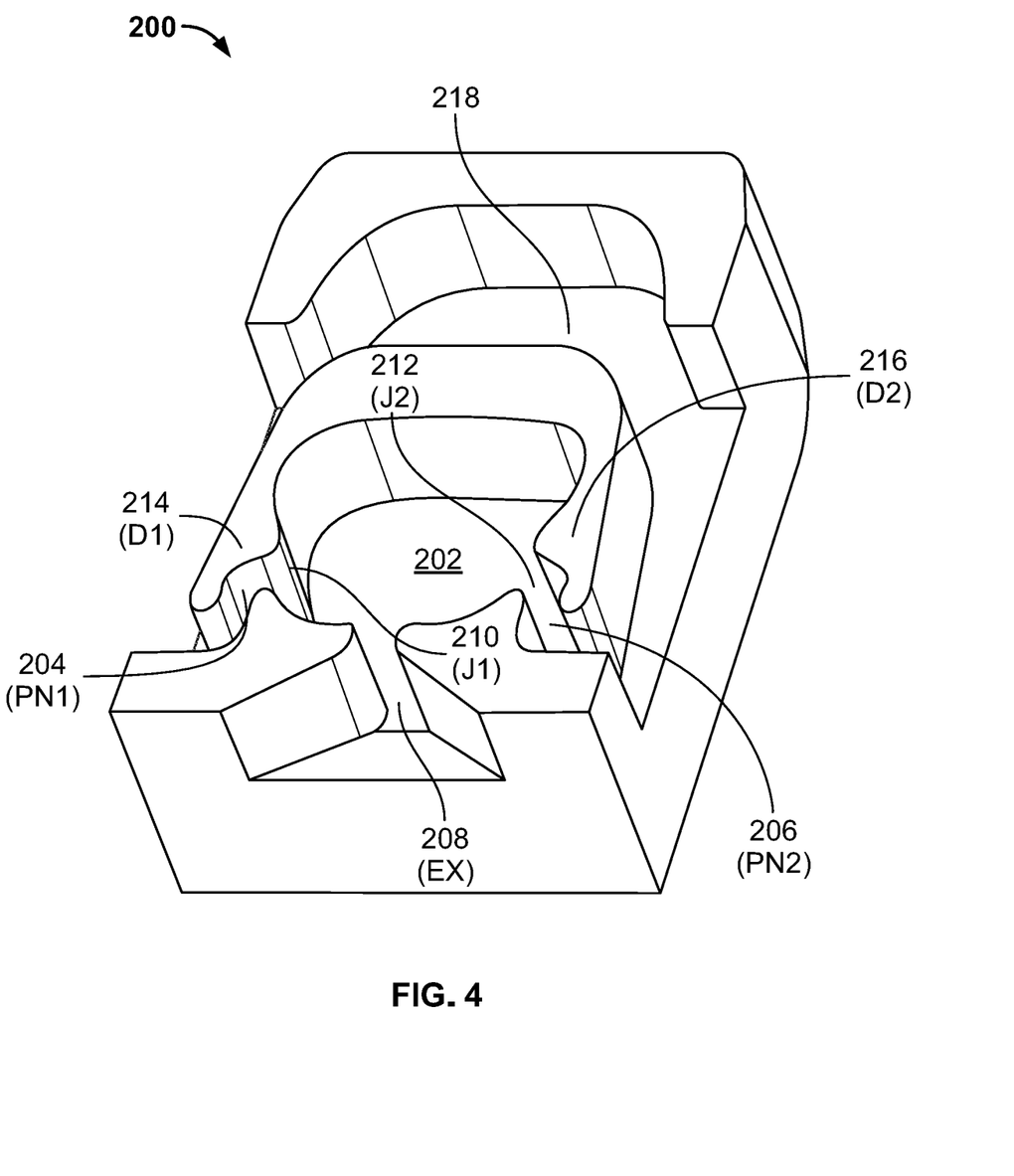
FIG. 4 is a cross-sectional perspective view of a fluidic nozzle insert according to the present invention.
Figure 5:
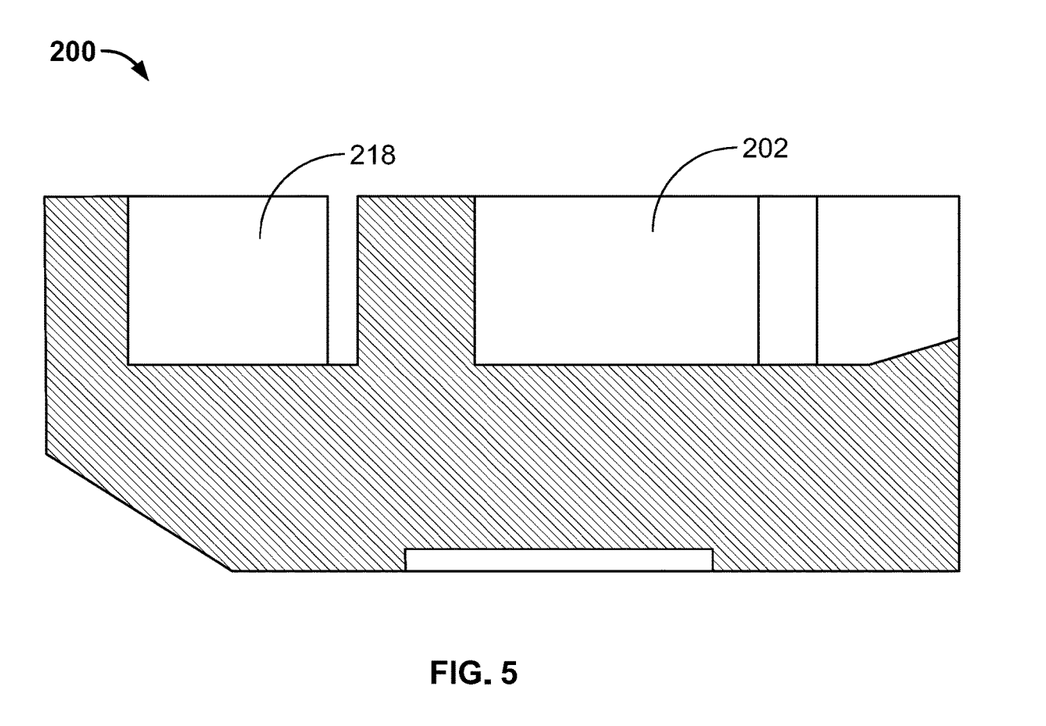
FIG. 5 is a side cross-sectional view of a fluidic nozzle insert according to the present invention.

Turning to FIGS. 4 and 5, FIG. 4 is a cross-sectional perspective view of fluidic nozzle insert 200 according to the present invention, while FIG. 5 is a side cross-sectional view of fluidic nozzle insert 200 according to the present invention.

Figure 6:
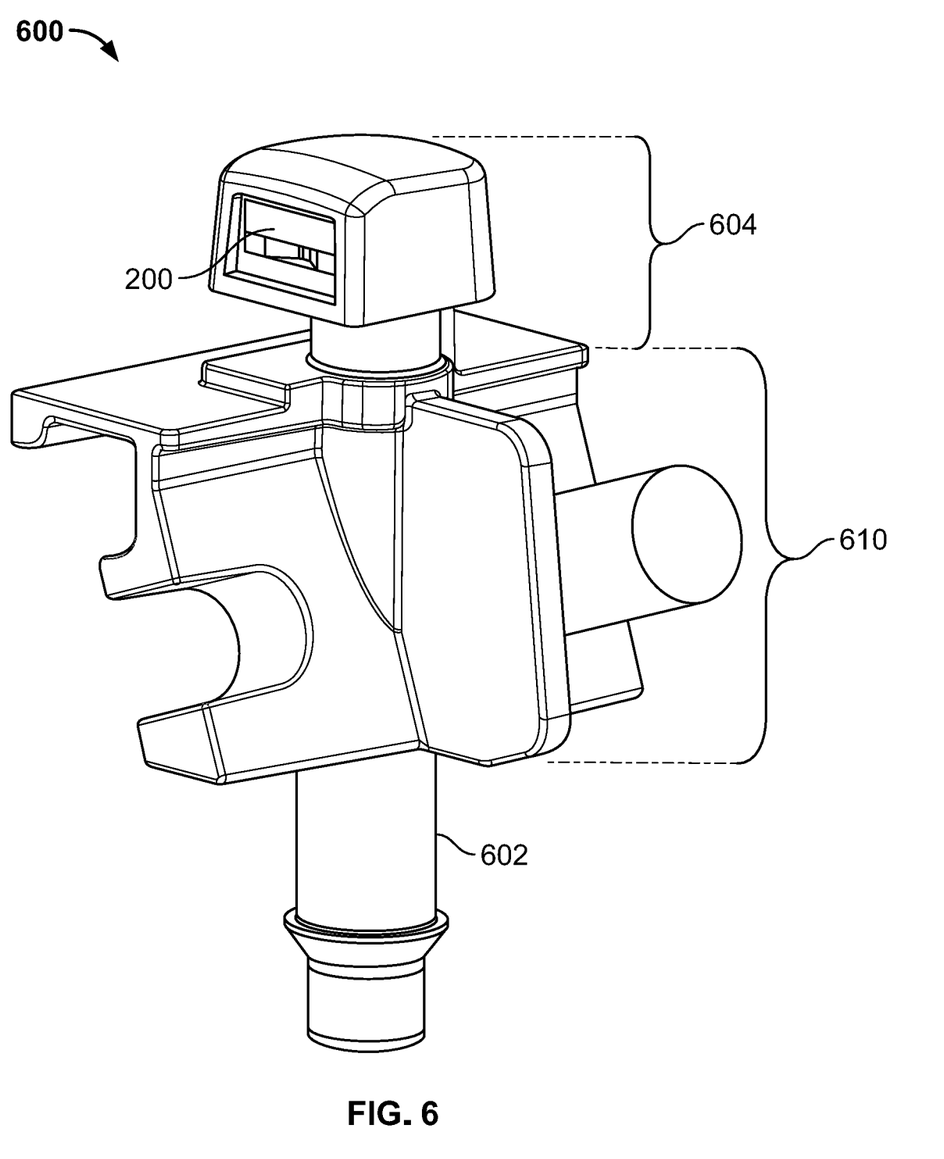
FIG. 6 is a prospective view of one embodiment of a fluidic nozzle assembly incorporating at least one fluidic nozzle insert according of the embodiments of FIGS. 2 through 5.

Turning to FIG. 6, FIG. 6 is a prospective view of one embodiment of a fluidic nozzle housing assembly 600 incorporating at least one fluidic nozzle insert, or chip member, 200 according of the embodiments of FIGS. 2 through 5. Fluidic nozzle housing assembly 600 has a post 602 for mounting the fluidic nozzle housing assembly on a vehicle or some other object, a raised fluidic nozzle assembly 604 having therein at least one fluidic nozzle insert receptacle 606 with at least one fluidic nozzle insert opening 608 (see FIG. 7) designed to receive therein at least one fluidic nozzle insert 200 according to any of FIGS. 2 through 4, and a fluidic nozzle housing assembly body 610 that connects post 602 to raised fluidic nozzle receptacle 604. Together post 602, raised fluidic nozzle assembly 604 and nozzle housing assembly body 610 can, in some instances or even all instances, facilitate the movement of raised fluidic nozzle assembly 604 in at least one spatial dimension, in at least two spatial dimensions, or even all three spatial dimensions. In another embodiment, post 602, raised fluidic nozzle assembly 604 and nozzle housing assembly body 610 can, in some instances or even all instances, facilitate the movement of all of nozzle housing assembly 600 in at least one spatial dimension, in at least two spatial dimensions, or even all three spatial dimensions. In another embodiment, housing body 610 of nozzle housing assembly 600 can be used to secure thereto one or more additional devices such as a camera or any other type of sensor (be it visual or otherwise) such that said one or more additional devices (not shown) are oriented in such a manner that fluidic nozzle assembly 604 having therein fluidic nozzle insert 200 can clean the information gathering lens thereof.

Figure 7:
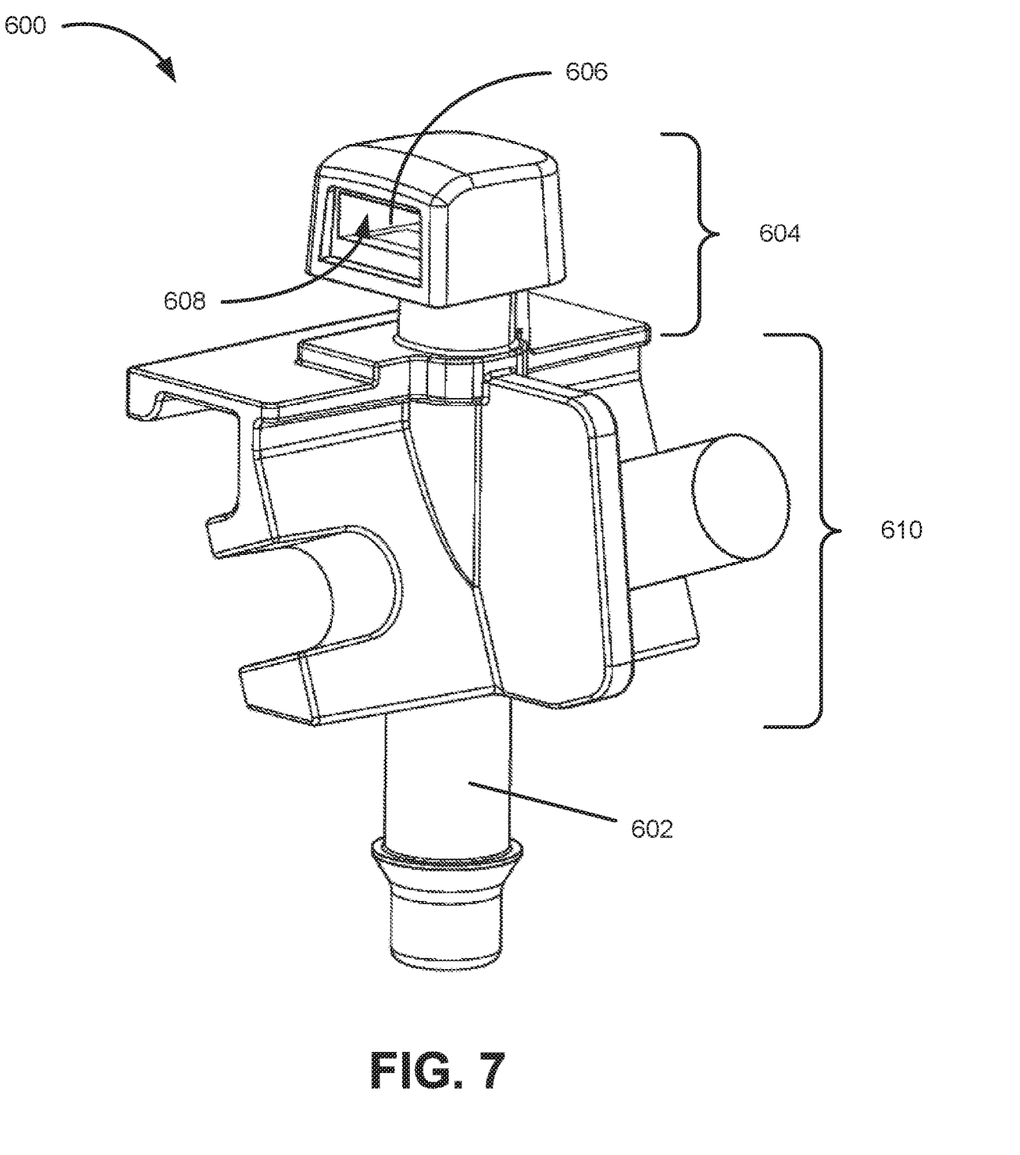
FIG. 7 is a prospective view of one embodiment of a fluidic nozzle assembly incorporating one fluidic nozzle insert according of the embodiments of FIGS. 2 through 5.

Turning to FIG. 7, FIG. 7 is a prospective view of one embodiment of a nozzle housing assembly 600 incorporating one fluidic nozzle insert 200 according of the embodiments of FIGS. 2 through 5 in an inverted orientation.

Having described preferred embodiments of a new compact nozzle assembly, fluidic insert geometry and improved method, it is believed that other modifications, variations and changes will be suggested to those skilled in the art in view of the teachings set forth herein. It is therefore to be understood that all such variations, modifications and changes are believed to fall within the scope of the present invention.

Figure 8:
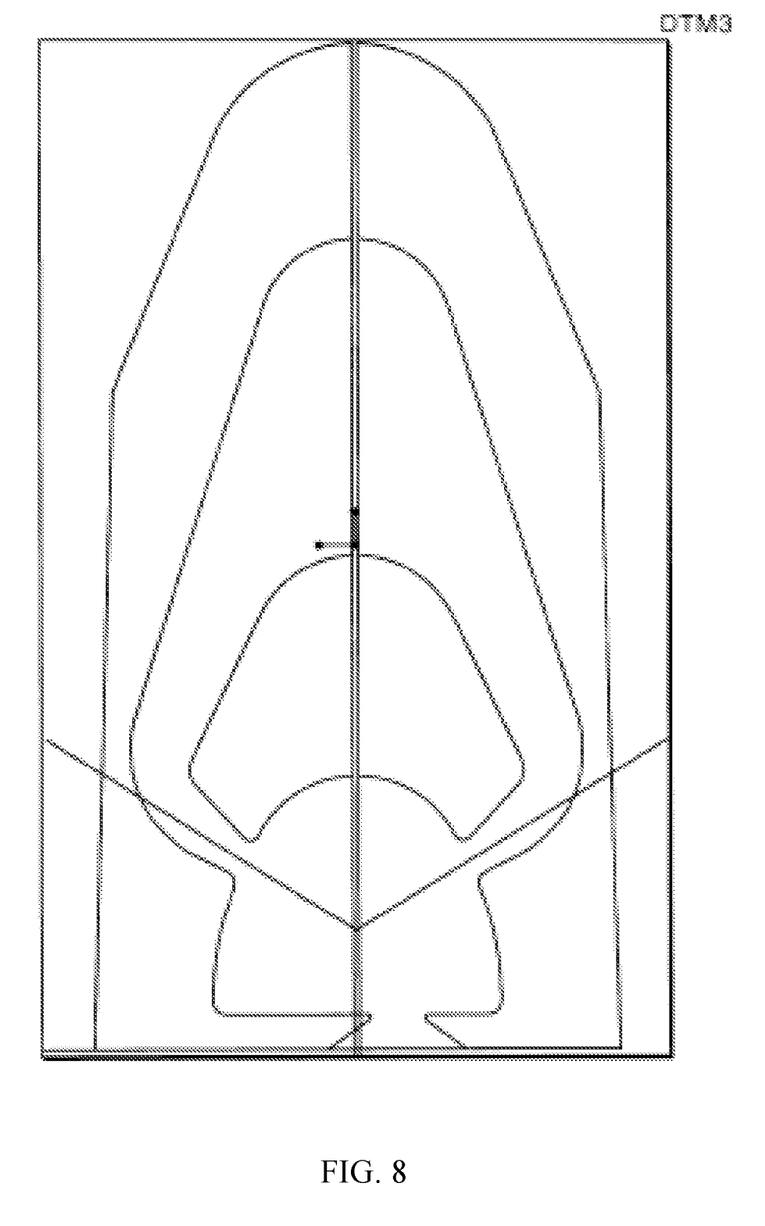
FIG. 8 is a plan view of an outlet throat is offset (to the right in the embodiment.

The power nozzles can have offsets which produce yaw angles in a fan angle to the left or right depending on the direction desired. In some embodiments, the exit throat is off axis (off the central axis of the symmetry) (FIG. 8) by a small fraction to the left or right to move the leftward or rightward yaw angles in the spray.

Although the invention has been described with reference to certain embodiments detailed herein, other embodiments can achieve the same or similar results. Variations and modifications of the invention will be obvious to those skilled in the art and the invention is intended to cover all such modifications and equivalents.

What is claimed is:

1. A fluidic nozzle insert comprising:
a fluidic nozzle insert structure having a width (W) less than or equal to about 7.5 mm and length (L) less than or equal to about 8 mm; and
a fluidic oscillator with a mushroom shaped geometry having a compact curved, bottom wall radius ($W_C$) in the range of about 0.5 mm to about 2 mm, wherein the bottom wall radius is positioned within an interaction region and at least partially defines at least one power nozzle for projecting a fluid jet into the interaction region;
wherein an edge block is defined having an edge block length ($T_L$) that ranges with respect to a throat width ($T_W$) anywhere from 0 to about 0.8 times the throat width ($T_W$), wherein a width of the interaction region ($I_W$) is about 5 to about 10 times a power nozzle width ($P_W$), wherein a height of the interaction region ($I_H$) is about 4 to about 8 times the power nozzle width ($P_W$), and wherein a throat offset ($T_O$) is within the range of about 0.05 to about 0.3 times the height of the interaction region ($I_H$).

2. The fluidic nozzle insert of claim 1, further comprising at least one source of fluid under pressure, at least a pair of power nozzles (PN1, PN2) connected to the at least one source of fluid under pressure for projecting at least a pair of fluid jets into the interaction region, and at least one outlet orifice from the interaction region for issuing a pulsating or oscillating jet of fluid to a point of utilization or ambient, wherein a single feed manifold is connected to power nozzles (PN1, PN2).

3. The fluidic nozzle insert of claim 1, wherein the shape of a single feed manifold forms one of the walls defining a flat top interaction or oscillation chamber, wherein the length of the fluidic nozzle insert structure is matched to fit existing housings, and wherein the nozzle assembly has offsets which produce yaw angles in a liquid spray fan angle to the left or right depending on the direction desired.

4. The fluidic nozzle insert of claim 1, wherein an outlet is off axis and wherein the outlet is aligned off of a central axis of the symmetry which is coaxial with a central spray axis by a fraction to the left or right to move the leftward or rightward yaw angles in the spray, and wherein the outlet may be offset along a longitudinal axis by an amount to produce a yaw angle of predetermined degree to the left or right depending on what is desired.

5. The fluidic nozzle insert of claim 1, wherein, wherein the edge block length ($T_L$) is defined with an included angle in the range of about 10° to about 30° for wall segments having a length $T_L=(0.0 \text{ to } 0.8)\cdot T_w$, where Tw represents the throat width.

6. The fluidic nozzle insert of claim 1, wherein the width of the fluidic nozzle insert structure is less than or equal to about 7 mm and the length is less than or equal to about 7.5 mm.

7. The fluidic nozzle insert of claim 1, wherein the width of the fluidic nozzle insert structure is less than or equal to about 6.5 mm and the length is less than or equal to about 7 mm.

8. The fluidic nozzle insert of claim 1, wherein the width of the fluidic nozzle insert structure is less than or equal to about 6 mm and the length is less than or equal to about 6.5 mm.

9. The fluidic nozzle insert of claim 1, wherein the width of the fluidic nozzle insert structure is less than or equal to about 5.5 mm and the length is less than or equal to about 6 mm.

10. The fluidic nozzle insert of claim 1, wherein the width of the fluidic nozzle insert structure is less than or equal to about 5 mm and the length is less than or equal to about 5.5 mm.

11. A fluidic nozzle assembly comprising:
a fluidic nozzle insert structure;
a nozzle post, wherein the nozzle post is designed to be mountable;
a raised fluidic nozzle insert receptacle, wherein the nozzle insert receptacle is designed to receive at least one fluidic nozzle insert in at least one cavity formed therein; and
a nozzle body, wherein the nozzle body is located between and connects both the nozzle post and the a raised fluidic nozzle insert receptacle,
wherein the fluidic nozzle insert comprises:
the fluidic nozzle insert structure having a width (W) less than or equal to about 7.5 mm and length (L) less than or equal to about 8 mm; and
a fluidic oscillator with a mushroom shaped geometry having a compact curved, bottom wall radius ($W_C$) in the range of about 0.5 mm to about 2 mm, wherein the bottom wall radius is positioned within an interaction region and at least partially defines at least one power nozzle for projecting a fluid jet into the interaction region;
wherein an edge block is defined having an edge block length ($T_L$) that ranges with respect to a throat width ($T_W$) anywhere from 0 to about 0.8 times the throat width ($T_W$), wherein a width of the interaction region ($I_W$) is about 5 to about 10 times a power nozzle width ($P_W$), wherein a height of the interaction region ($I_H$) is about 4 to about 8 times the power nozzle width ($P_W$), and wherein a throat offset ($T_O$) is within the range of about 0.05 to about 0.3 times the height of the interaction region ($I_H$).

12. The fluidic nozzle assembly of claim 11, further comprising at least one source of fluid under pressure, at least a pair of power nozzles (PN1, PN2) connected to the at least one source of fluid under pressure for projecting at least a pair of fluid jets into the interaction region, and at least one outlet orifice from the interaction region for issuing a pulsating or oscillating jet of fluid to a point of utilization or ambient, wherein a single feed manifold is connected to power nozzles (PN1, PN2).

13. The fluidic nozzle assembly of claim 11, wherein the shape of a power nozzle one of the walls of defining a flat top interaction or oscillation chamber, wherein the length of the fluidic nozzle insert structure is matched to fit existing housings, and wherein the nozzle assembly has offsets which produce yaw angles in a liquid spray fan angle to the left or right depending on the direction desired.

14. The fluidic nozzle assembly of claim 11, wherein an outlet is off axis and wherein the outlet is aligned off of a central axis of the symmetry which is coaxial with a central spray axis by a fraction to the left or right to move the leftward or rightward yaw angles in the spray, and wherein the outlet may be offset along a longitudinal axis by an amount to produce a yaw angle of predetermined degree to the left or right depending on what is desired.

15. The fluidic nozzle assembly of claim 11, wherein, wherein the edge block length ($T_L$) is defined with an included angle in the range of about 10° to about 30° for wall segments having a length $T_L=(0.0 \text{ to } 0.8) \cdot T_w$, where Tw represents the throat width.

16. The fluidic nozzle assembly of claim 11, wherein the fluidic nozzle insert structure has a width (W) less than or equal to about 7 mm and length (L) less than or equal to about 7.5 mm.

17. The fluidic nozzle assembly of claim 11, wherein the fluidic nozzle insert structure has a width (W) less than or equal to about 6.5 mm and length (L) less than or equal to about 7 mm.

18. The fluidic nozzle assembly of claim 11, wherein the fluidic nozzle insert structure has a width (W) less than or equal to about 6 mm and length (L) less than or equal to about 6.5 mm.

19. The fluidic nozzle assembly of claim 11, wherein the fluidic nozzle insert structure has a width (W) less than or equal to about 5.5 mm and length (L) less than or equal to about 6 mm.

20. The fluidic nozzle assembly of claim 11, wherein the fluidic nozzle insert structure has a width (W) less than or equal to about 5 mm and length (L) less than or equal to about 5.5 mm.

21. The fluidic nozzle assembly of claim 11, wherein the nozzle post, the raised fluidic nozzle insert receptacle and the nozzle body act together to permit the movement of at least the raised fluidic nozzle insert receptacle in at least one spatial dimension.

22. The fluidic nozzle assembly of claim 11, wherein the nozzle post, the raised fluidic nozzle insert receptacle and the nozzle body act together to permit the movement of at least the raised fluidic nozzle insert receptacle in at least two spatial dimensions.

23. The fluidic nozzle assembly of claim 11, wherein the nozzle post, the raised fluidic nozzle insert receptacle and the nozzle body act together to permit the movement of at least the raised fluidic nozzle insert receptacle in all three spatial dimensions.

24. The fluidic nozzle assembly of claim 11, wherein the nozzle post, the raised fluidic nozzle insert receptacle and the nozzle body act together to permit the movement of all of the nozzle assembly in at least one spatial dimension.

25. The fluidic nozzle assembly of claim 11, wherein the nozzle post, the raised fluidic nozzle insert receptacle and the nozzle body act together to permit the movement of all of the nozzle assembly in at least two spatial dimensions.

26. The fluidic nozzle assembly of claim 11, wherein the nozzle post, the raised fluidic nozzle insert receptacle and the nozzle body act together to permit the movement of all of the nozzle assembly in all three spatial dimensions.

27. The fluidic nozzle assembly of claim 11, wherein the nozzle body is designed to receive and secure at least one additional device or sensor such that the fluidic nozzle assembly can clean the at least one additional device or sensor.

28. The fluidic nozzle assembly of claim 11, wherein the fluidic nozzle insert is oriented in an inverted orientation in the raised fluidic nozzle insert receptacle.

* * * * *